United States Patent
Ice

[19]

[11] Patent Number: 5,884,031
[45] Date of Patent: Mar. 16, 1999

[54] METHOD FOR CONNECTING CLIENT SYSTEMS INTO A BROADCAST NETWORK

[75] Inventor: Jeffrey L. Ice, Loxahatchee, Fla.

[73] Assignee: Pipe Dream, Inc., West Palm Beach, Fla.

[21] Appl. No.: 724,333

[22] Filed: Oct. 1, 1996

[51] Int. Cl.$^6$ ..................................................... G06F 13/00
[52] U.S. Cl. ......................................................... 395/200.33
[58] Field of Search ............................. 395/200.3, 200.33, 395/200.47, 200.57; 340/825.01

[56] References Cited

U.S. PATENT DOCUMENTS 5,353,412  10/1994  Douglas et al. .
5,461,624  10/1995  Mozzola .

*Primary Examiner*—Moustafa M. Meky
*Assistant Examiner*—Hassan Ibrahim
*Attorney, Agent, or Firm*—Norman Friedland

[57] ABSTRACT

A private network is built by first allowing a pre-determined number of client systems to connect directly to a server system. After this occurs, additional client systems requesting connection are furnished with the addresses of client systems already connected within the private network. Each of the additional client systems then makes connections with a multiple number of client systems to receive information from the server system. Each of these client systems subsequently accepts connections from up to a second pre-determined number of client systems to which it transmits information received from the server system.

15 Claims, 5 Drawing Sheets

| NUMBER OF ROWS | CLIENT SYSTEMS IN LAST ROW | TOTAL CLIENT SYSTEMS |
|---|---|---|
| 1 | 2 | 2 |
| 2 | 4 | 6 |
| 3 | 8 | 14 |
| 4 | 16 | 30 |
| 5 | 32 | 62 |
| 6 | 64 | 126 |
| 7 | 128 | 254 |
| 8 | 256 | 510 |
| 9 | 512 | 1,022 |
| 10 | 1,024 | 2,046 |
| 11 | 2,048 | 4,094 |
| 12 | 4,096 | 8,190 |
| 13 | 8,192 | 16,382 |
| 14 | 16,384 | 32,766 |
| 15 | 32,768 | 65,534 |
| 16 | 65,536 | 131,070 |

*FIG. 5.*

METHOD FOR CONNECTING CLIENT SYSTEMS INTO A BROADCAST NETWORK

BACKGROUND OF THE INVENTION

1. Field of the Invention

This invention relates to a method for making connections on the Internet, and, more particularly, to a method for causing connections to be made among client systems.

2. Background Information

The conventional structure of the Internet is based on combinations of clients and servers, in which the client systems obtain information from the servers. Thus, to retrieve information, an individual client system makes a connection with a server and requests the particular information needed. The information is then sent from the server to the client. With this method, each client has an individual connection to the server. If there are too many connections to the server to allow a new connection to be established, a client wishing to make an additional connection is denied access. What is needed is a way to increase the number of clients which can be connected to a single server without requiring a substantial increase in the server hardware to provide additional ports.

Some servers provide what appears to be a broadcasting function by relaying information from one client connected to the server to all other clients connected to the same server. An example of this type of information sharing is found in the "chat relay" server protocol. However, this type of interconnection is also limited by the number of clients which can be connected to the server. Again, what is needed is a way to increase the number of clients which can be interconnected in a substantial way.

SUMMARY OF THE INVENTION

In accordance with one aspect of the invention, there is provided a process for connecting client systems within a private network. This process includes the steps of connecting client systems, up to a first pre-determined maximum number of systems, directly to a server system through a public network, and connecting additional client systems, beyond the first pre-determined maximum number, to other client systems to form the private network extending through connections within the public network to the server system.

BRIEF DESCRIPTION OF THE DRAWINGS

FIG. 5 is a table showing the number of systems in a last row of the network of FIG. 1, and the total number of systems in the network, as a function of the number of rows therein.

DETAILED DESCRIPTION

Figure 1:
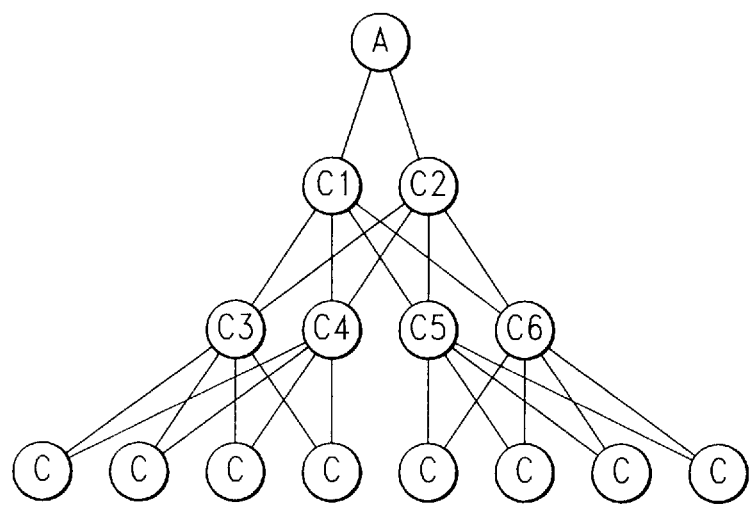
FIG. 1 is a diagrammatic view of a private network built into a pyramid in accordance with the present invention.

FIG. 1 is a diagrammatic view of a private network built into a pyramid in accordance with the present invention, showing connections established among a single server and various clients. In this diagram, the single server is indicated as A, and the clients are indicated as C, followed by numerals as required for identification.

The establishment of this network structure is begun as the client C1 requests a connection to the private network by sending a message to server A. Since a connection can be made directly the server A, with client C1 being the first client to connect, the server A responds by telling the client C1 to establish a direct connection to the server. The same procedure if followed when a second client C2 requests a connection to the private network.

However, in the example of FIG. 1, only two connections can be made directly to the server A. Therefore, when a new client C3 requests a connection from the server A, it receives an instruction from server A to connect to client C1, and also to C2 in case C1 goes down. Similarly, additional clients C4, C5, and C6 are connected to clients C1 and C2.

The expanding structure of the private network is determined by the number of clients which are allowed to connect to each client. In the example of FIG. 1, each client, except for C1 and C2, is connected upward to two clients, and each client, except for those at the bottom, or end, of the structure, is connected to four clients below. Thus, with these exceptions, each client is connected to two additional clients for receiving information, so that continuity is maintained if a client goes down, and up to four clients for disseminating information. The server A sends information from a database of data to be broadcast to the clients to which it is directly connected, in this example to clients C1 and C2. These clients, and those below them, in turn relay the data from one level to another.

Figure 2:
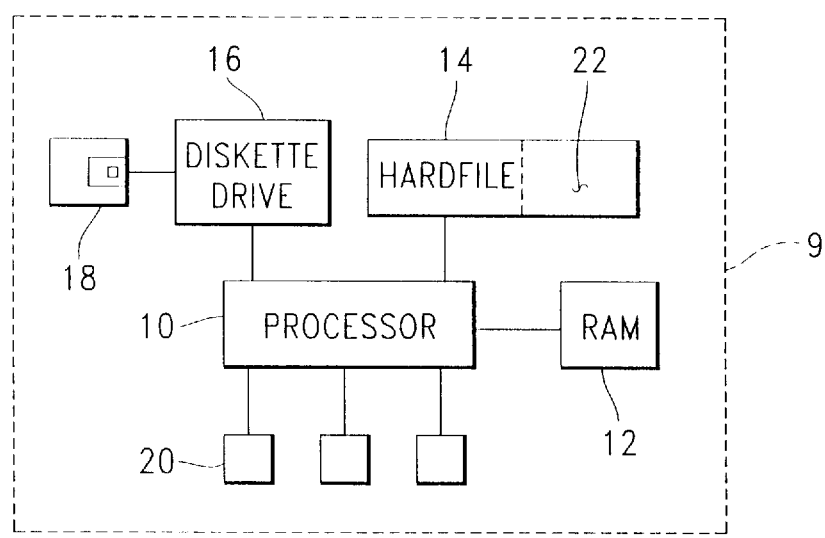
FIG. 2 is a block diagram of a computing system, representing either a server system or a client system in FIG. 1.

FIG. 2 is a block diagram of a computing system, which represents both the server A of FIG. 1 and ono of the client systems C, also shown in FIG. 1. This computing system 9 includes a processor 10, associated system memory 12, a hardfile 14, a disk drive 16 for reading a floppy disk 18, and a number of output ports 20 for connections with client systems.

The program connecting server A with these client systems in accordance with this invention is preferably written on one or more diskettes 18, to be loaded within the server A into system memory 12 and hardfile storage 14 through the disk drive 16. The hardfile 14 also includes a database 22 holding a list of all clients presently connected to the private network, with their IP (Internet Protocol) addresses. While this database 22 is shown as residing in the hardfile 14, it may reside additionally, partially, or alternately in system memory 12, facilitating rapid access to the address information.

The program connecting a client system C to server A through other client systems C in accordance with this invention is loaded within the client system C into system memory 12 and hardfile 14 from one or more diskettes 18. Alternately, this program may be downloaded through network connections between the server A and the client C into the system memory 12 of the client C for execution by the processor 10 and for storage within the hardfile 14.

Figure 3:
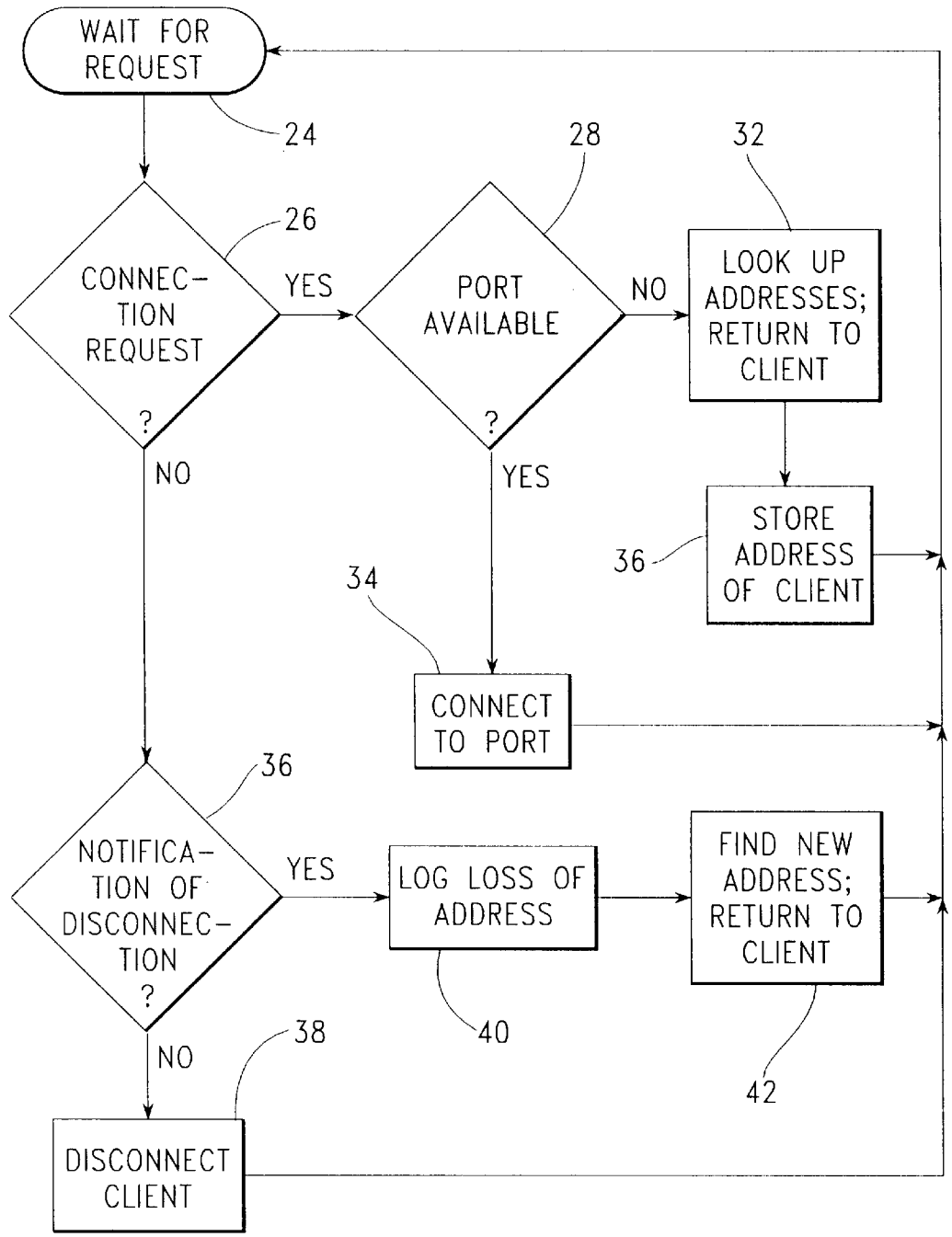
FIG. 3 is a flow chart of processes occuring in the server system of FIG. 1 to provide for the connection of client systems into the private network of FIG. 1 or for their disconnection therefrom.

FIG. 3 is a flow chart of processes occurring within the server A (shown in FIG. 1) operating in accordance with the present invention to provide for the connection of client systems to the private network and for their disconnection therefrom.

Referring to FIGS. 2 and 3, in block 24, the server A is waiting for an incoming request from a client, which may be either a request for a new connection or a notification from a disconnection of an existing connection. A notification of disconnection is sent to server A by a system which has been connected to the system disconnecting from the private network, but which is one connection farther away from the server than the disconnecting system. Thus, the system notifying the server of a disconnection has just lost one of its two private network connections for receiving information from server A.

When a request is received, a determination is made in block 26 of whether it is a request for connection. If the request is a request for connection, a determination is made in block 28 of whether a port 20 of the server A is available. In the example of FIG. 1, the connections of clients C1 and C2 were made directly to the server because a port 20 was available when the connection request was made. Thus, if a port 20 is available, as determined in block 28, the client making the request is connected to the port in block 30. If a port 20 is not available, in block 32, the server A looks up two available IP addresses within its database 22 and returns this information to the requesting client. Next, in block 34, the server A logs the IP address of the client which has made the request into the database 22, so that additional clients may subsequently be connected to this new element within the private network. Then the server A returns to block 24 to wait for the next request.

On the other hand, if the request to server A is determined in block 26 not to be a request for connection, a determination is made in block 36 of whether it is a notification of a disconnection. If it is not such a notification, in block 38, the server A disconnects the client system making the request from the private network, as it has made an invalid request. If it is determined in block 36 that the request is a notification of disconnection, in block 40 the address of the disconnected client is removed from database 22. Next, in block 42, server A looks up an additional available IP address within the database 22 and returns this information to the client providing notification of a disconnection, so that it can re-establish a second data link through a new client whose address has been provided. Then the server returns again to block 24 to wait for another request to process.

Figure 4A:
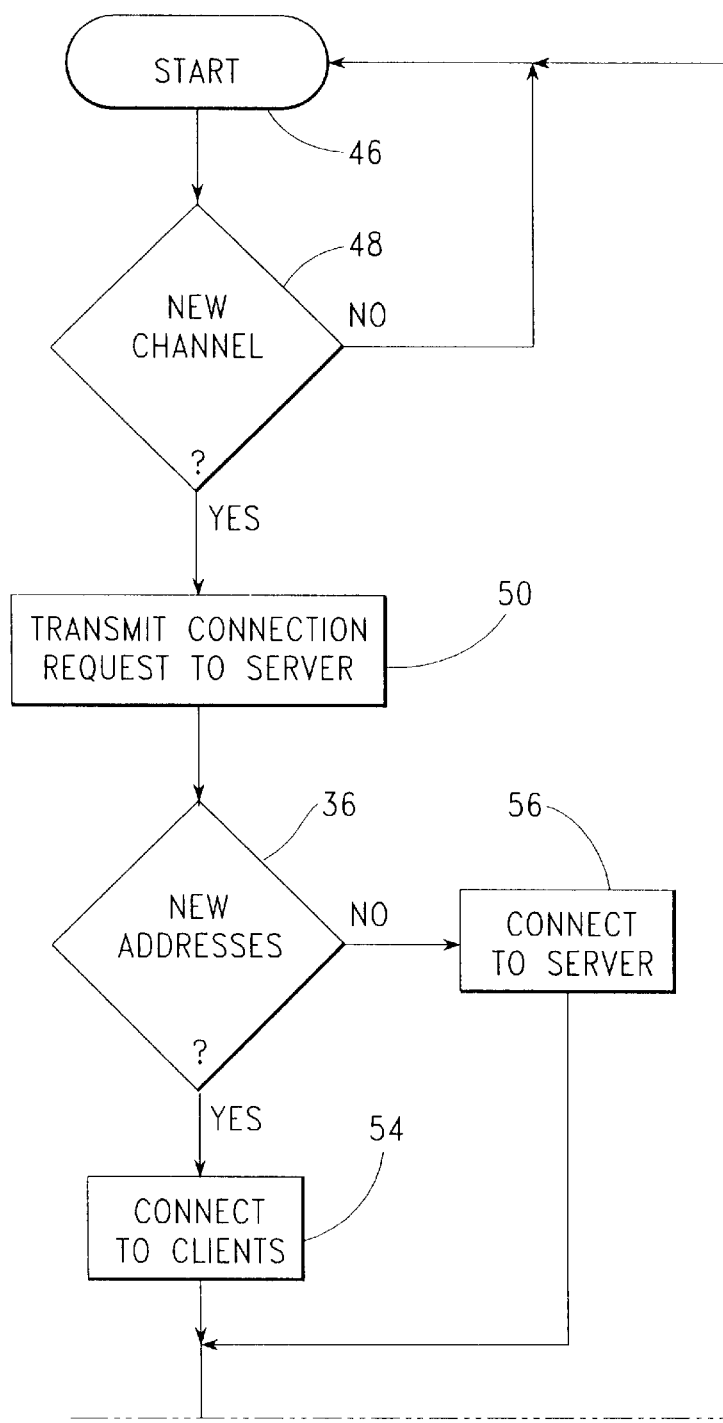
FIGS. 4A–4B is a flow chart of processes occuring in the server system of FIG. 1 to provide for the connection of client systems into the private network of FIG. 1 or for their disconnection therefrom, with FIG. 4A being an upper portion of FIG. 4, and with FIG. 4B being a lower portion thereof.
Figure 4B:
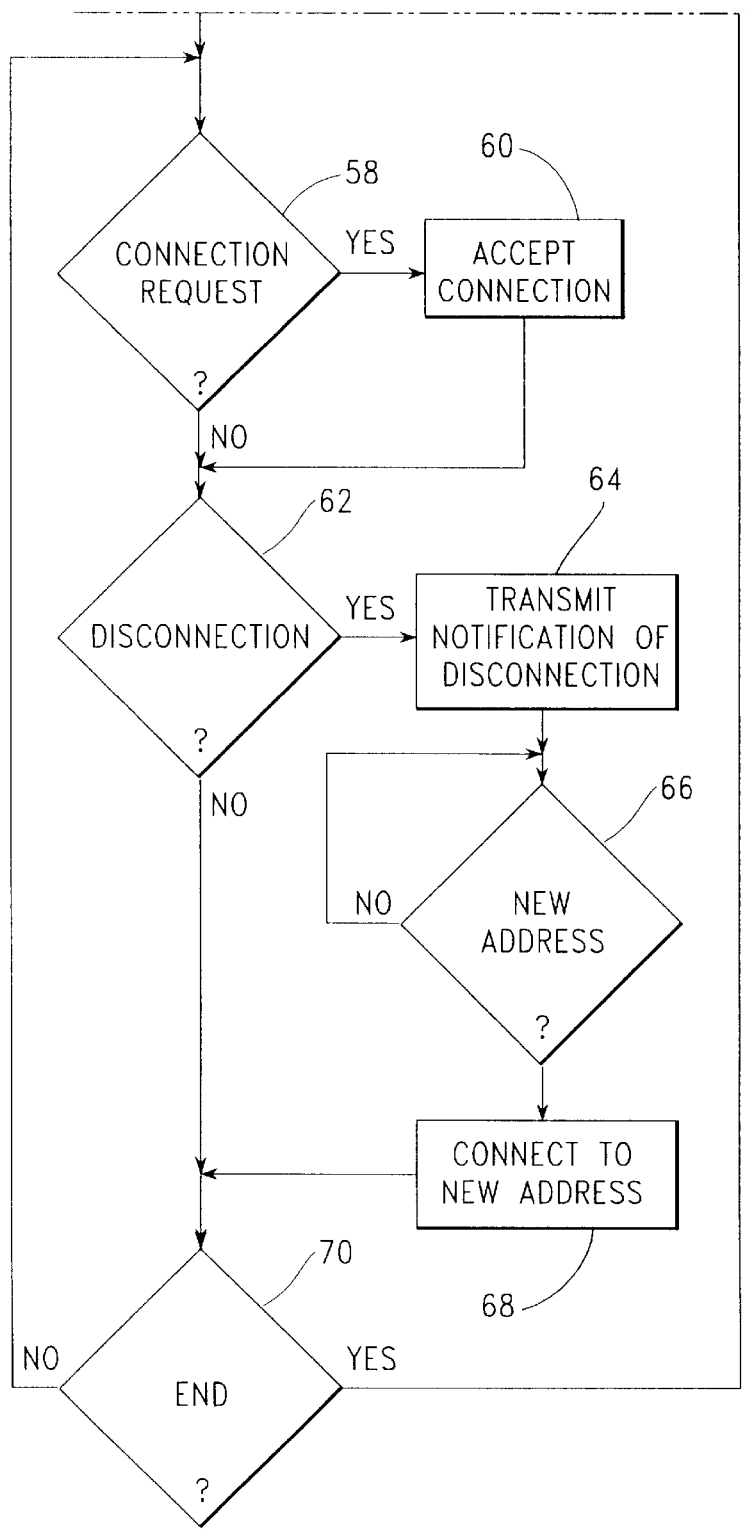

FIG. 4 is a flow chart of processes occurring within the client C (shown in FIG. 1) operating in accordance with the present invention to provide for the connection of client systems to the private network and for their disconnection therefrom.

Referring to FIGS. 1 and 4, these processes begin with the system in start block 46, waiting for a request for a new connection. In start block 46, the system may be, for example, performing calculations or providing other functions for its user. The command to make a new connection may come from a user interaction with the system. After this command occurs, as determined in block 48, a request for a connection is sent to the server A in block 50. Then the server connects the client system directly to itself, if a port for such a connection is available, or sends two new addresses. If the new addresses are sent, as determined in block 52, connection is made to the new addresses in block 54. Otherwise, a direct connection is made to the server in block 56.

In either case, the server A can now instruct up to four other client systems C to connect to the client executing the processes of FIG. 4. Thus, when such a connection request is received from another client, as determined in block 58, the connection is accepted in block 60. If one of the two systems to which the client C is connected becomes disconnected for any reason, as determined in block 62, the client C transmits a disconnection notification to the server A in block 64. When the server subsequently responds with a new address, as determined in block 66, a connection is made to the new address in block 68. Connection within the private network may be terminated, for example, at the request of the user, at any time. When this occurs, as determined in block 70, the client system returns to the start in block 46.

FIG. 5 is a tabular view of the number of client systems C which may be connected in the last row (i.e. the row farthest from the server A), together with the total number of client systems C as a function of the number of client system rows in the private network structure. In general, the last row is only partly filled, with a total number of client systems other than one of the total numbers listed in FIG. 5.

The table of FIG. 5 reflects the assumptions of FIG. 1, that two client systems are directly connected to the server system, that each other client system is connected to receive information from the server system through two other client systems, and that each client system, except for the last row thereof, has four other client systems connected to it to receive such information. While these pre-determined rules for connection are used to form the structure of the private network, they may be changed to vary the structure of the private network, or to account for various hardware configurations, within the scope of the present invention.

While the invention has been described in its preferred form or embodiment with some degree of particularity, it is understood that this description has been given only by way of example and that numerous changes in the details of construction, fabrication and use, including the combination and arrangement of parts and process steps, may be made without departing from the spirit and scope of the invention.

What is claimed is:

1. A process for connecting client systems within a private network, wherein said process comprises the steps of:

(a) connecting client systems, up to a first pre-determined maximum number thereof, directly to a server system through a public network;

(b) connecting additional client systems within a plurality thereof, beyond said first pre-determined maximum number thereof, to other client systems to form said private network extending through connections within said public network to said server system;

wherein each client system within said plurality thereof is connected to a second pre-determined number of client systems within said plurality thereof through said public network for receiving information from said server system;

wherein each said client system is connectable to up to a pre-determined number of client systems for transmitting information through said public network from said server system;

Wherein said step (b) includes the steps of:

(d) transmitting a request for connection from an additional client system within said plurality thereof to said server systems;

(e) transmitting addresses, of said second pre-determined number of available client systems connected within said private network, to said additional client system from said server system; and (f) establishing connections between said additional client system and said second pre-determined number of available client systems connected within said private network.

2. The process of claim 1, additionally comprising a step (c) of maintaining said second pre-determined number of connections between each client system within said plurality thereof and other client systems within said plurality thereof, for receiving information from said server system by establishing new connections among said client systems when a disconnection occurs.

3. The process of claim 1, wherein each available client system within said second pre-determined number thereof has connected thereto for receiving information therefrom fewer than a third pre-determined number of client systems within said plurality thereof.

4. The process of claim 2, wherein said step (c) includes the steps of:
- (g) transmitting a disconnection notification to said server system from a partly disconnected client system within said plurality thereof, wherein said partly disconnected client system has been connected for receiving information from said server system to a client system disconnecting from said private network;
- (h) transmitting, from said server system to said partly disconnected client system, an address of an available client system within said plurality thereof connected within said private network; and
- (i) establishing a connection between said available client system and said partly disconnected client system.

5. The process of claim 4, wherein said available client system has connected thereto for receiving information therefrom fewer than a third pre-determined number of client systems within said plurality thereof.

6. A process executing within a server system for establishing a private network of client systems within a plurality thereof to receive information from said server system, wherein said process comprises the steps of:
- (a) receiving a request for connection from a client system issuing said request;
- (b) determining if a port of said server system is available for connection with said private network;
- (c) if a port of said server system is available for connection within said private network, as determined in step (b), connecting said client system issuing said request to said port;
- (d) if a port of said server system is not available for connection within said private network, as determined in step (b), sending to said client system issuing said request a first pre-determined number of addresses of available client systems within said plurality thereof connected within said private network; and
- (e) adding an address of said client system issuing said request to a list of addresses within a database residing in said server system.

7. The process of claim 6, comprising in addition the steps of:
- (f) receiving a disconnection notification from a partly disconnected system within said private network, wherein said partly disconnected client system has been connected for receiving information from said server system to a client system disconnecting from said private network;
- (g) sending to said client system issuing said disconnection notification an address of a client system within said plurality thereof connected within said private network; and
- (h) removing an address of said client system disconnecting from said private network from a database including addresses of client systems connected within said private network.

8. The process of claim 7, wherein, within said steps (d) and (g) said available client systems have fewer than a second predetermined number of client systems attached thereto for transmitting information received from said server system.

9. A process executing within a particular client system for establishing a private network of client systems within a plurality thereof to receive information from a server system, wherein said process comprises the steps of:
- (a) transmitting a connection request to said server system;
- (b) receiving addresses of available client systems within said private network from said server system;
- (c) connecting to said available client system for receiving information from said server system;
- (d) receiving a connection request from an additional client system within said plurality thereof; and
- (e) establishing a connection with said additional client system to transmit information received from said server system.

10. The process of claim 9, additionally comprising the steps of:
- (f) being disconnected from a first client system connected within said private network between said particular client system and said server system;
- (g) transmitting a notice of disconnection to said server system;
- (h) receiving an address of an available client system connected within said private network from said server system; and
- (i) establishing a connection with said available client system identified by said address received in step (h).

11. A computer readable medium upon which coded steps are written for a process executing within a server system for establishing a private network of client systems within a plurality thereof to receive information from said server system, wherein said process comprises the steps of:
- (a) receiving a request for connection from a client system issuing said request;
- (b) determining if a port of said server system is available for connection with said private network;
- (c) if a port of said server system is available for connection within said private network, as determined in step (b), connecting said client system issuing said request to said port;
- (d) if a port of said server system is not available for connection within said private network, as determined in step (b), sending to said client system issuing said request a first pre-determined number of addresses of available client systems within said plurality thereof connected within said private network; and
- (e) adding an address of said client system issuing said request to a list of addresses within a database residing in said server system.

12. The medium of claim 11, wherein said process comprises in addition the steps of:
- (f) receiving a disconnection notification from a partly disconnected system within said private network, wherein said partly disconnected client system has been connected for receiving information from said server system to a client system disconnecting from said private network;

(g) sending to said client system issuing said disconnection notification an address of a client system within said plurality thereof connected within said private network; and (h) removing an address of said client system disconnecting from said private network from a database including addresses of client systems connected within said private network.

13. The medium of claim 12, wherein, within said steps (d) and (g) said available client systems have fewer than a second predetermined number of client systems attached thereto for transmitting information received from said server system.

14. A computer readable medium upon which coded steps are written for a process executing within a particular client system for establishing a private network of client systems within a plurality thereof to receive information from a server system, wherein said process comprises the steps of:

(a) transmitting a connection request to said server system;

(b) receiving addresses of available client systems within said private network from said server system;

(c) connecting to said available client system for receiving information from said server system;

(d) receiving a connection request from an additional client system within said plurality thereof; and (e) establishing a connection with said additional client system to transmit information received from said server system.

15. The medium of claim 14, wherein said process additionally comprises the steps of:

(f) being disconnected from a first client system connected within said private network between said particular client system and said server system;

(g) transmitting a notice of disconnection to said server system;

(h) receiving an address of an available client system connected within said private network from said server system; and (i) establishing a connection with said available client system identified by said address received in step (h).

* * * * *